Figure 1:
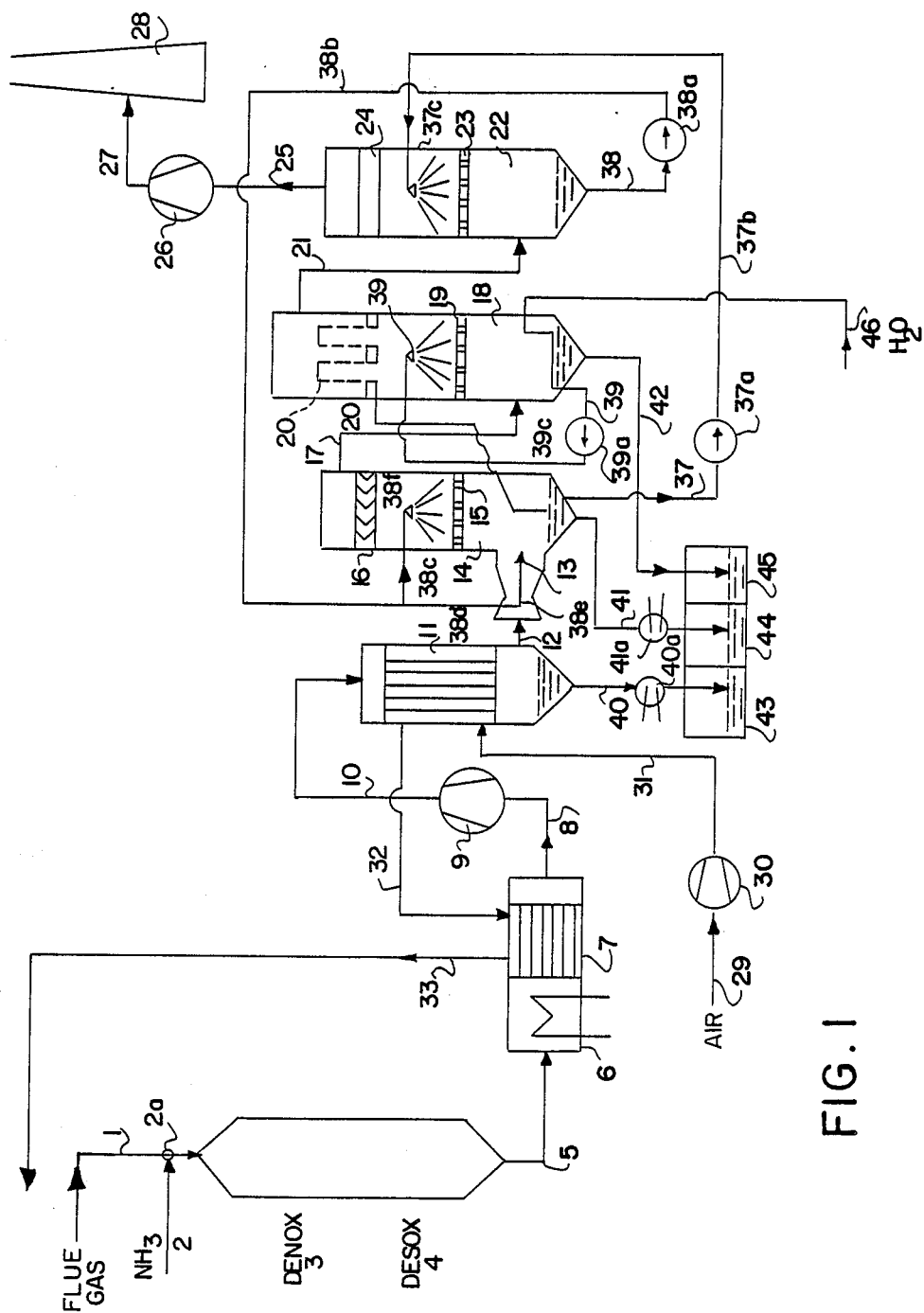

United States Patent [19]
Dörr et al.

[11] Patent Number: 4,842,835
[45] Date of Patent: Jun. 27, 1989

[54] PROCESS OF PURIFYING FLUE GASES

[75] Inventors: Karl H. Dörr, Mainz; Hugo Grimm, Miltenberg; Heinz Neumann, Riedstadt; Wolfgang Fennemann, Karben; Norbert Ohlms, Münster, all of Fed. Rep. of Germany

[73] Assignees: Metallgesellschaft Aktiengesellschaft, Frankfurt am Main; Stadtwerke Munster GmbH, Münster, both of Fed. Rep. of Germany

[21] Appl. No.: 74,645

[22] Filed: Jul. 17, 1987

[30] Foreign Application Priority Data

Jul. 19, 1986 [DE] Fed. Rep. of Germany ....... 3624462

[51] Int. Cl.$^4$ ............................................. C01B 17/00
[52] U.S. Cl. .................................... 423/242; 423/522
[58] Field of Search ................ 423/242 A, 242 R, 522

[56] References Cited

U.S. PATENT DOCUMENTS

| | | |
|---|---|---|
| 3,531,664 | 9/1970 | Hals ...................... 423/522 |
| 3,733,393 | 5/1973 | Couillaud et al. ................. 423/522 |
| 3,815,667 | 6/1974 | Brown ................................ 423/522 |
| 4,454,100 | 6/1984 | Faatz ................................. 423/242 |

*Primary Examiner*—Gregory A. Heller
*Attorney, Agent, or Firm*—Sprung Horn Kramer & Woods

[57] ABSTRACT

Flue gases or other contaminated humid exhaust gases which contain SO$_3$ are cooled by an indirect heat exchange in a heat exchanger to a temperature below the dew point temperature of sulfuric acid and are cooled further to a predetermined temperature in an SO$_3$ condenser by means of dilute sulfuric acid, which is sprayed to flow in a countercurrent to the gas, whereby dilute sulfuric acid having a predetermined concentration is condensed. The gas leaving the SO$_3$ condenser is scrubbed and cooled to a temperature from 40° to 55° C. in a fine scrubber by a treatment with a sprayed aqueous liquor. The exit gas is reheated to a predetermined temperature in a reheater by a treatment with sprayed dilute sulfuric acid from the SO$_3$ and after the condensation of SO$_3$ is passed through a filter. Dilute sulfuric acid from the reheater is sprayed into the SO$_3$ condenser. The temperature of the gas in the reheater is so selected that the water which has been absorbed is not condensed but remains in the gaseous effluent. The exit temperature of the gas leaving the heat exchanger is approximately so selected that the temperature at which dilute sulfuric acid becomes available is approximately the same as the temperature of the gas in the reheater. The rate at which dilute sulfuric acid is sprayed is so adjusted that the dilute sulfuric acid withdrawn from the fine scrubber is at a temperature which is approximately the same as the required exit temperature of the gas leaving the SO$_3$ condenser.

8 Claims, 2 Drawing Sheets

PROCESS OF PURIFYING FLUE GASES

DESCRIPTION

This invention relates to a process of purifying flue gases or other contaminated humid exhaust gases which contain $SO_3$.

Flue gases from furnaces contain pollutants consisting mainly of $SO_2$, $NO_x$, HCl and HF. For instance, the flue gases produced by the combustion of pit coal having a sulfur content of 1% by weight in large furnaces may contain 6% by volume oxygen and in that case will contain 1900 to 2000 mg $SO_2$ per $sm^3$, less than 150 mg HCl per $sm^3$ and less than 50 mg HF per $sm^3$. In dependence on the nature of the combustion process and of the coal which is burnt the $NO_x$ content may range from less than 600 mg to more than 2000 mg $NO_2$ per $sm^3$.

It is known that the emission of such pollutants can be decreased in that the flue gas is subjected to a catalytic aftertreatment, in which $SO_2$ is oxidized to $SO_3$ and $NO_x$ is reduced with $NH_3$ to $N_2$. The humid gas is subsequently cooled below the dew point temperature of sulfuric acid and $SO_3$ is condensed in the form of sulfuric acid.

Such process is known from Published German Application No. 33 31 545. The $SO_3$-containing humid gas is initially cooled to a temperature above the dew point temperature of sulfuric acid in a first stage of an air preheater and is subsequently cooled below the dew point temperature of sulfuric acid in a second stage of said air preheater. The second stage of the air preheater is constructed of acid-resisting material, such as glass tubes. In the second stage the gas must not be cooled below a lower temperature limit, which is so determined that the temperature at the chimney outlet will not be lower than the minimum temperature prescribed in the regulations for large furnaces and that the exhaust gas will have the required lift in the chimney. For this reason the gases cannot be subjected to a fine purification at low temperatures.

It is an object of the invention to remove $SO_3$ by a condensation in the form of sulfuric acid having the highest possible concentration and to remove other gaseous pollutants which may be present, such as HCl, HF and $SO_2$, and to provide by a simple and economical manner technology the gas temperature which is required for the chimney.

That object is accomplished in accordance with the invention in that (a) the flue gas is cooled by an indirect heat exchange in a heat exchanger to a temperature below the dew point temperature of sulfuric acid, (b) the cooled gas is cooled further to a predetermined temperature in an $SO_3$ condenser by means of dilute sulfuric acid, which is sprayed to flow in a countercurrent to the gas, whereby dilute sulfuric acid having a predetermined concentration is condensed, (c) the gas leaving the $SO_3$ condenser is scrubbed and cooled to a temperature from 40° to 55° C. in a fine scrubber by a treatment with a sprayed aqueous liquor, (d) the gas leaving the fine scrubber is reheated to a predetermined temperature in a reheater by a treatment with sprayed dilute sulfuric acid from the $SO_3$ condenser, (e) the gas from which $SO_3$ has been condensed is passed through a filter, (f) dilute sulfuric acid leaving the reheater is sprayed into the $SO_3$ condenser, (g) the temperature of the gas in step (d) is so selected that the water absorbed in step (c) is not condensed but remains in the gaseous effluent, (h) the exit temperature of the gas in step (a) is approximately so selected that the temperature of the dilute sulfuric acid obtained in step (b) is approximately the same as the temperature of the gas in step (d), and (i) the rate at which dilute sulfuric acid is sprayed in step (d) is so adjusted that the dilute sulfuric acid withdrawn in step (d) is at a temperature which approximately corresponds to the required exit temperature of the gas in step (b).

The heat exchanger is designed to resist corrosion and consists, e.g., of a tubular heat exchanger comprising glass tubes, plastic tubes, tubes which are coated with plastic or vitreous enamel, or graphite tubes. The cooling fluid preferably consists of air. The preheated air may be heated further in a succeeding normal heat exchanger and may then be used as combustion air. The sulfuric acid which has condensed in the heat exchanger may flow into the succeeding $SO_3$ condenser or may be withdrawn as a product; in the latter case, it will have a somewhat higher concentration. The $SO_3$ condenser may consist of an empty tower, of a tower having a bed of packing elements, or of a tower containing one or more nozzle plates, which are sprayed with the dilute sulfuric acid. The sulfuric acid may be sprayed or sprinkled. The outlet may be preceded by a mist collector. The dilute sulfuric acid is collected in a sump at the bottom. A vertical or horizontal venturi may be connected between the heat exchanger and the $SO_3$ condenser and may be used for an additional treatment of the gas with sprayed dilute sulfuric acid. The fine scrubber may be designed like the condenser or may consist of a venturi for fine scrubbing in cocurrent operation. The fine scrubber may be mounted on top of the $SO_3$ condenser or may be separately mounted. In both cases the liquid circuits will not be interconnected. The aqueous liquor may consist of water or of highly dilute sulfuric acid having a concentration up to about 20% or of any other liquor which is capable of absorbing HCl and HF. The aqueous liquor is suitably recirculated and is made up with water in the amount which has been absorbed by he gas. The pollutants which have been absorbed in the fine scrubbing stage are continuously removed from a branched off partial stream or are discontinuously removed, e.g., by neutralization. The reheater may be designed like the $SO_3$ condenser and is preferably arranged for countercurrent operation. The filter may be incorporated in the reheater, fine scrubber or $SO_3$ condenser. The filter may consist of a cartridge filter or of a wire mesh filter or of a multiplate filter or of a bed of granular filter material. The sumps of the $SO_3$ condenser and of the reheater may communicate with each other for an equalization of the quantities of acid. The temperature to which the gas is cooled in the $SO_3$ condenser will depend on the partial pressures of the $H_2O$ and $H_2SO_4$ in the mixture. The concentration of the condensed dilute sulfuric acid is mainly selected in the range from 60 to 75%. All other temperatures and acid rates which are required will depend on that concentration, on the temperature required in the fine scrubber and on the rate of absorption of water vapor therein.

In a preferred embodiment the dilute sulfuric acid has a concentration of 60 to 80% by weight, preferably 60 to 75% by weight. With those concentrations the desired exit temperature of the gas leaving the reheater will be obtained in a particularly desirable and economical manner.

In a preferred embodiment the aqueous liquor which is sprayed into the fine scrubber contains $H_2O_2$ or $H_2S_2O_8$. This will ensure that residual $SO_2$ will also be oxidized to $SO_3$ and absorbed. Besides, fluctuations in the catalytic reaction of $SO_2$ to $SO_3$ or a failure of the catalyst will be compensated and the $NO_x$ content will be reduced.

In a preferred embodiment the aqueous liquor which is sprayed in the fine scrubber is recirculated and is cooled by an indirect heat exchange. This will result in a higher concentration of the pollutants in the absorbent liquor and will facilitate the further processing. Besides, the utilization of any $H_2O_2$ or $H_2S_2O_8$ which has been added will be improved.

In a preferred embodiment the temperature of the gas leaving the reheater is increased by an admixing of hot gases. Temperature fluctuations can effectively be compensated by an admixing of a small partial stream consisting, e.g., of hot air. Such an admixing may also be necessary if the structural materials used require the sulfuric acid to have such a low concentration that the required exhaust gas temperature cannot entirely be achieved.

Figure 2:
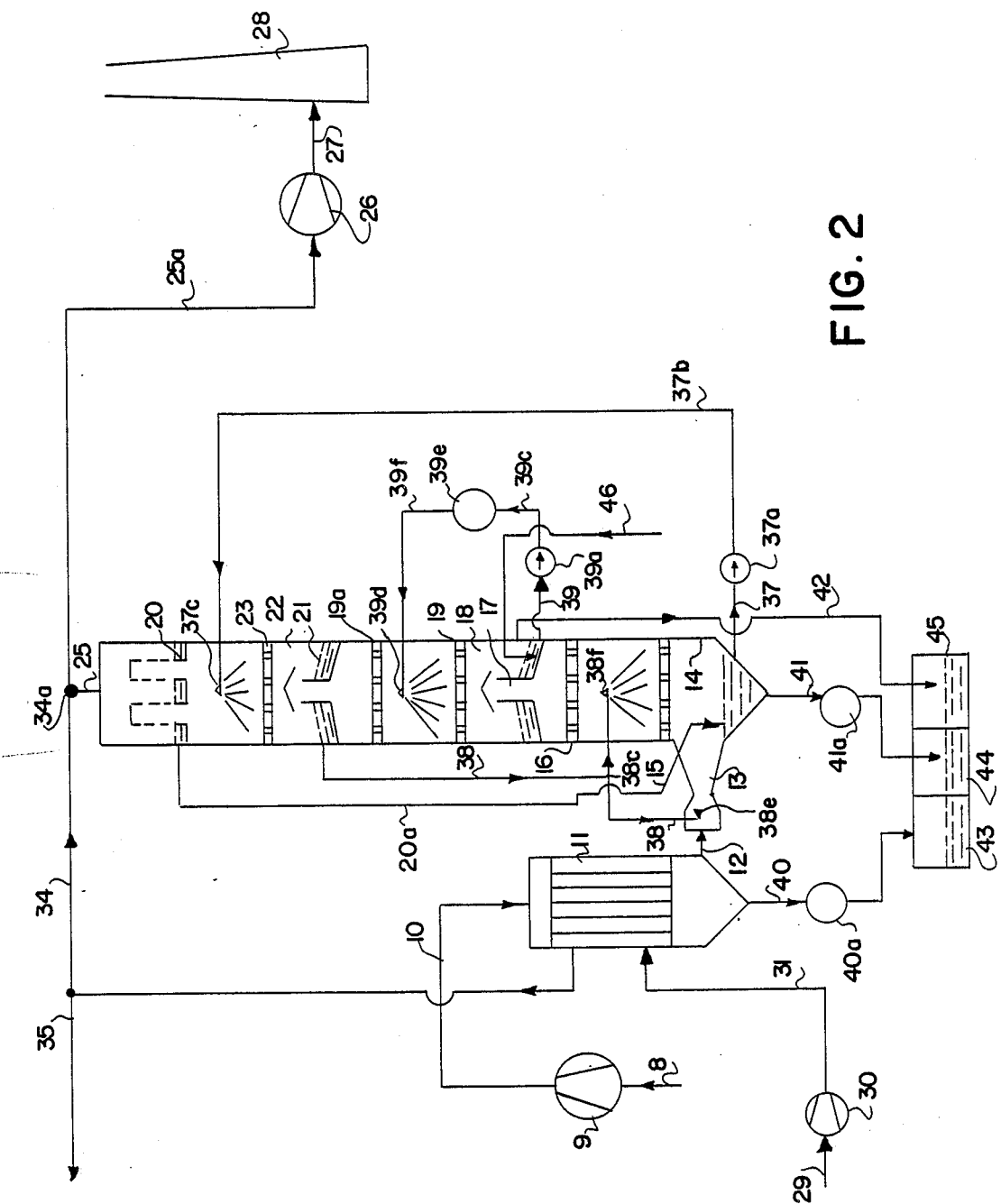

In a preferred embodiment the temperature of the dilute sulfuric acid fed from the $SO_3$ condenser to the reheater is increased by an indirect heat exchange. That measure will also provide a solution to the above-mentioned problems. Reheating is effected by extraneous heat, such as steam. The invention will be explained more in detail and by way of example with reference to FIGS. 1 and 2. FIG. 1 shows an arrangement of separately installed units whereas the units are arranged one over the other in FIG. 2.

EXAMPLE 1 (FIG. 1)

Dedusted flue gases from a coal-firing furnace are fed via line 1 to the DENOX-DESOX catalyzer tower 3, 4. The flue gas has the following contents per $sm^3$ (standard cubic meter): about 2000 mg $SO_2$, about 800 mg $NO_x$, about 50 mg $SO_3$, about 150 mg HCl, about 30 mg HF and about 50 g $H_2O$, and is at a temperature of about 450° C. as it enters the tower 3, 4. In a mixer 2a, $NH_3$ from a line 2 is admixed to the flue gas. In the DENOX catalyzer 3, $NO_x$ is reduced with $NH_3$ to $N_2$. In the DESOX catalyzer 4, $SO_2$ is oxidized to $SO_3$.

The substantially catalyzed flue gas is conducted in line 5 to a feed water preheater 6 and enters the same at a temperature of about 450°. The flue gas is cooled to about 400° C. in the feed water preheater 6 and is cooled further to about 230° to 250° C. in the air preheater 7.

The gas is supplied via line 8, fan 9 and line 10 to an air-preheating condenser 11, in which the gases are cooled to about 157° C. and about 30% of the $SO_3$ contained in the flue gas are condensed. The gas then flows in line 12 to the condensing tower 14, which comprises a cocurrent-flow venturi 13 provided with a sprayer 38e and a countercurrentflow section 14 provided with a nozzle plate 15, a sprayer 38f and a mist collector 16. In the condensing tower 14, about 70% of the $SO_3$ still contained in the flue gas are condensed at about 92°. The flue gas from which $SO_3$ has been substantially completely removed is fed to the fine scrubber 18 and enters the latter at a temperature of about 92° C. The fine scrubber 18 comprises a distributing plate 19, a sprayer 39d and filter cartridges 20 and is operated at a temperature of about 40° C. to sufficiently remove HCl, HF and traces of $SO_2$ and $SO_3$ from the gas by a treatment with an aqueous liquor having a low concentration of sulfuric acid or by means of sulfuric acid having a concentration of about 5 to 20% by weight. The $H_2SO_4$ mists are collected in the cartridge filter 20. In the scrubber 18 the gases are cooled from about 92° C. to about 40° C. by an evaporation of water. $H_2O$ at a rate of about 2.4 $m^3/h$ is fed via line 46 to the fine scrubber 18 and is evaporated therein.

The gas conducted in line 21 enters the reheating tower 22 at a temperature of about 40° C. In the reheating tower 22 provided with a distributing plate 23 and a sprayer 37c the gas is preheated to about 105° C. The purified flue gas is discharged into the atmosphere via the line 25, fan 26, line 27 and chimney 28. The exhaust gas has the following contents per $sm^3$: 130 to 150 mg $SO_2$, 30 to 40 mg $SO_3$, 50 to 60 mg HCl, 50 to 60 mg $NO_x$ (calculated as N), traces of HF, about 78 g $H_2O$.

Combustion air at a rate of 120,000 $sm^3/h$ is fed via line 29, fan 30 and line 31 into the airpreheating condenser 11 and enters the latter at a temperature of about 40°. The air is preheated in the airpreheating condenser 11 to about 120° to 130° C. and is subsequently fed in line 32 to the air preheater 7 and is further preheated therein to 280° to 290° C. The combustion air is then fed in line 33 to the coal-firing furnace.

At a rate of about 255 $m^3/h$, sulfuric acid having a concentration of about 70% by weight $H_2SO_4$ is fed from the sump of the condensing tower 13/14 via line 37, acid pump 37a and line 37b to the sprayer 37c of the reheating tower 22 and enters the latter at a temperature of about 105°. the acid which has been cooled to about 92° C. in the tower 22 is fed via line 38, acid pump 38a and lines 38b, 38c, 38d to the sprayers 38e and 38f of the countercurrent-flow section 14, in which the acid is reheated to about 105° C.

An aqueous liquor having a low concentration of sulfuric acid or dilute sulfuric acid is withdrawn from the sump of the fine scrubber 18 at a rate of about 150 $m^3/h$ and is fed via line 39, pump 39a, and line 39c to the sprayer 39d of the fine scrubber 18 and enters the latter at a temperature of about 40° C. The condensate collected in the cartridge filter 20 is conducted via line 20a to the sump of the condensing tower 14. The product acid obtained in the air-preheating condenser 11 at a rate of about 2.2 $m^3/day$ has a concentration of about 75% by weight $H_2SO_4$ and is fed in line 40 to enter the acid cooler 40a at a temperature of about 150° C. The acid which has been cooled to about 40° C. in the acid cooler 40a is collected in the storage container 43. The product acid obtained in the condensing tower 13/14 at a rate of about 5.1 $m^3/day$ has a concentration of about 70% by weight $H_2SO_4$ and is fed in line 41 to the acid cooler 41a and is cooled therein to about 40° C. and is subsequently collected in the storage container 44. The aqueous liquor which becomes available in the fine scrubber 18 has a low concentration of sulfuric acid and is laden with HCl and HF and is fed via line 42 to the storage container 45.

EXAMPLE 2 (FIG. 2)

The flue gas has the composition described in Example 1.

Flue gas at a rate of 120,000 $sm^3/h$ is cooled to 230° to 250° C. in a preceding air preheater 7 as described in Example 1 (FIG. 1).

The gas is fed via line 8, fan 9 and line 10 to the air-preheating condenser 11, in which the gases are cooled to about 120° C. and about 40% of the $SO_3$ contained in the flue gas are condensed. The gas is then fed via line 12 to the condensing tower 14, which consists of a cocurrent-flow venturi 13 provided with a sprayer 38*3* and of a countercurrent-flow section 14, which is provided with a sprayer 38*f* and a mist collector 16. About 60% of the $SO_3$ contained in the flue gas are condensed in the condensing tower 14 at about 75° C.

The flue gas from which $SO_3$ has been sufficiently removed is fed in the internal line 17 to the fine scrubber 18 and enters the latter at a temperature of about 75° C. In the fine scrubber 18 provided with a distributing plate 19 and a sprayer 39*d* the HCl and HF contained in the gas and part of the residual $SO_2$ are removed at a temperature of about 40° C. by a treatment with sulfuric acid which has a concentration of about 20% and is laden with $H_2O_2$. $H_2O_2$ or $HS_2O_8$ is fed to the fine scrubber 18 via line 46. The acid used to cool the gas from about 75° to about 40° C. is cooled in the acid cooler 39*e*. Gas is conducted via the internal gas line 21 to the reheating tower 22 and enters the latter at a temperature of about 40° C. In the reheating tower 22 provided with a distributing plate 23 and a sprayer 37*c* the gas is preheated to about 80° C. The $H_2SO_4$ mists are collected in the cartridge filter 20.

The gas leaves the plant via line 25. Hot air at a temperature of about 150° C. is supplied in line 34 at a rate of about 5000 sm$^3$/h to the mixing chamber 34*a* and in the latter is admixed to the flue gas to raise its temperature from about 80° C. to about 83° C.

The purified flue gas is discharged into the atmosphere via line 25*a*, fan 26, line 27 and chimney 28.

The exhaust gas has the following contents per sm$^3$: 30 to 40 mg $SO_2$, 20 to 30 mg $SO_3$, 50 to 60 mg HCl, 50 to 60 mg $NO_x$ (calculated as NO), traces of HF, about 55 g $H_2O$.

Air at a rate of 125,000 sm$^3$/h is fed via line 29, fan 30 and line 31 to the air-preheating condenser 11 and enters the latter at a temperature of about 30° C. and in the air-preheating condenser 11 is preheated to about 140° to 150° C. Combustion air at a rate of about 120,000 sm$^3$/h is fed via line 35 to the coal firing furnace. The mixing chamber 34*a* is also supplied via line 34 with preheated air at a rate of about 5,000 sm$^3$. Sulfuric acid having a concentration of about 62% by weight $H_2SO_4$ is fed from the sump of the condensing tower 13/14 at a rate of about 400 m$^3$/h via line 37, acid pump 37*a* and line 37*b* to the sprayer 37*c* of the reheating tower 22 and enters the latter at a temperature of about 80° C. The acid which has been cooled in the tower 22 to about 75° C. is fed via lines 38, 38*d* and 38*c* to the sprayers 38*e* and 38*f* of the countercurrent-flow section 14, in which the acid is reheated to about 80° C.

Dilute sulfuric acid at a rate of about 400 m$^3$/h is conducted from the sump of the fine scrubber 18 via line 39, pump 39*a*, line 39*c*, cooler 39*e* and line 39*f* to the sprayer 39*d* of the fine scrubber 18 and enters the latter at a temperature of about 45° C. The condensate collected in the cartridge filter 20 is conducted in line 20*a* to the sump of the condensing tower 14.

The product acid collected in the air-preheating condenser 11 at a rate of about 3.3 m$^3$/day has a concentration of about 70% by weight $H_2SO_4$ and is fed via line 40 to the acid cooler 40*a* and enters the latter at a temperature of about 120° C. The product acid which has been cooled to about 40° C. in the acid cooler 40*a* is collected in the storage container 43.

The product acid collected in the condensing tower 13/14 at a rate of about 5 m$^3$/day has a concentration of about 62% by weight $H_2SO_4$ and is fed via line 41 to the acid cooler 41*a*. The acid which has been cooled to about 40° C. in the acid cooler 41*a* is collected in the storage container 44.

The sulfuric acid which is collected in the fine scrubber 18 has a concentration of about 20% and is laden with HCl and HF and is fed via line 42 to the storage container 45.

The advantages afforded by the invention reside in that the $SO_3$ content as well as other pollutants, such as HCl and HF, can be substantially completely removed from flue gases or other gases having a low $SO_3$ content in such a manner that a sulfuric acid having a relatively high concentration is produced and nevertheless the purified exhaust gas having a sufficiently high temperature for the chimney is obtained by simple and economical technology.

It will be be understood that the specification and examples are illustrative but not limitative of the present invention and that other embodiments within the spirit and scope of the invention will suggest themselves to those skilled in the art.

We claim:

1. A process of purifying flue gases or other contaminated humid exhaust gases which contain $SO_3$, characterized in that
   (a) the flue gas is cooled by an indirect heat exchange in a heat exchanger to a temperature below the dew point temperature of sulfuric acid,
   (b) the cooled gas is cooled further to about 75° to 92° C. in an $SO_3$ condenser by means of dilute sulfuric acid, which is sprayed to flow in a countercurrent to the gas, whereby dilute sulfuric acid having a predetermined concentration is condensed,
   (c) the gas leaving the $SO_3$ condenser is scrubbed and cooled to a temperature from 40° to 55° C. in a fine scrubber by a treatment with a sprayed aqueous sulfuric acid liquor capable of absorbing HCl and HF,
   (d) the gas leaving the fine scrubber is reheated to a temperature of about 80° to 105° C. in a reheater by a treatment with sprayed dilute sulfuric acid from the $SO_3$ condenser,
   (e) the gas from which $SO_3$ has been condensed is passed through a filter,
   (f) dilute sulfuric acid leaving the reheater is sprayed into the $SO_3$ condenser,
   (g) the temperature of the gas in step (d) is so selected that the water absorbed in step (c) is not condensed but remains in the gaseous effluent,
   (h) the exit temperature of the gas in step (a) is approximately 120° to 157° C. so that the temperature of the dilute sulfuric acid obtained in step (b) is approximately the same as the temperature of the gas in step (d), and
   (i) the rate at which dilute sulfuric acid is sprayed in step (d) is so adjusted that the dilute sulfuric acid withdrawn in step (d) is at a temperature which approximately corresponds to the required exit temperature of the gas in step (b).

2. A process according to claim 1, characterized in that the dilute sulfuric acid has a concentration of 60 to 80% by weight.

3. A process according to claim 1, characterized in that the aqueous liquor which is sprayed in the fine scrubber also contains $H_2O_2$ or $H_2S_2O_8$.

4. A process according to claim 1, characterized in that the aqueous liquor which is sprayed in the fine scrubber is recirculated and is cooled by an indirect heat exchange.

5. A process according to claim 1, characterized in that the temperature of the gas leaving the reheater is increased by an admixing of hot gases.

6. A process according to claim 1, characterized in that the temperature of the dilute sulfuric acid which is fed from the $SO_3$ condenser to the reheater is increased by an indirect heat exchange.

7. A process according to claim 1, wherein in
(b) the predetermined temperature is about 92° C.,
(d) the predetermined temperature is about 105° C.,
(h) the exit temperature of the gas in step (a) is about 157° C., and
(i) the temperature of the withdrawn acid is about 92° C.

8. A process according to claim 1, wherein in
(b) the predetermined temperature is about 75° C.,
(d) the predetermined temperature is about 80° C.,
(h) the exit temperature of the gas in step (a) is about 120° C., and
(i) the temperature of the withdrawn acid is about 75° C.

* * * * *